United States Patent
Denil et al.

(10) Patent No.: US 12,271,823 B2
(45) Date of Patent: *Apr. 8, 2025

(54) TRAINING MACHINE LEARNING MODELS BY DETERMINING UPDATE RULES USING NEURAL NETWORKS

(71) Applicant: DeepMind Technologies Limited, London (GB)

(72) Inventors: Misha Man Ray Denil, London (GB); Tom Schaul, London (GB); Marcin Andrychowicz, London (GB); Joao Ferdinando Gomes de Freitas, London (GB); Sergio Gomez Colmenarejo, London (GB); Matthew William Hoffman, London (GB); David Benjamin Pfau, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,754

(22) Filed: Mar. 8, 2023

(65) Prior Publication Data

US 2023/0376771 A1    Nov. 23, 2023

Related U.S. Application Data

(63) Continuation of application No. 16/302,592, filed as application No. PCT/US2017/033703 on May 19, 2017, now Pat. No. 11,615,310.
(Continued)

(51) Int. Cl.
*G06N 3/084*    (2023.01)
*G06N 3/044*    (2023.01)
*G06N 3/045*    (2023.01)

(52) U.S. Cl.
CPC ............ *G06N 3/084* (2013.01); *G06N 3/044* (2023.01); *G06N 3/045* (2023.01)

(58) Field of Classification Search
None
See application file for complete search history.

(56) References Cited

U.S. PATENT DOCUMENTS 8,768,870 B1    7/2014 Corrado et al.
2010/0010949 A1    1/2010 Ito et al.
(Continued)

OTHER PUBLICATIONS

Oohira et al. "Meta-learning for Fast Incremental Learning." ICANN/ICONIP 2003, LNCS 2714, pp. 157-164, 2003 (Year: 2003).*
(Continued)

*Primary Examiner* — Ryan C Vaughn
*Assistant Examiner* — Asher H. Jablon
(74) *Attorney, Agent, or Firm* — Fish & Richardson P.C.

(57) ABSTRACT

Methods, systems, and apparatus, including computer programs encoded on computer storage media for training machine learning models. One method includes obtaining a machine learning model, wherein the machine learning model comprises one or more model parameters, and the machine learning model is trained using gradient descent techniques to optimize an objective function; determining an update rule for the model parameters using a recurrent neural network (RNN); and applying a determined update rule for a final time step in a sequence of multiple time steps to the model parameters.

19 Claims, 4 Drawing Sheets

Related U.S. Application Data

(60) Provisional application No. 62/339,785, filed on May 20, 2016.

(56) References Cited

U.S. PATENT DOCUMENTS

| | | |
|---|---|---|
| 2014/0229221 A1 | 8/2014 | Shih et al. |
| 2018/0025269 A1 | 1/2018 | Dursun et al. |
| 2019/0220748 A1 | 7/2019 | Denil et al. |

OTHER PUBLICATIONS

Andrychowicz et al., "Learning to learn by gradient descent by gradient descent," arXiv 1606.04474, Jun. 14, 2016, 16 pages.
Bach et al., "Optimization with sparsity inducing penalties," Foundations and Trends in Machine Learning, 2012, 108 pages.
Balduzzi et al. "Strongly-Typed Recurrent Neural Networks," Feb. 6, 2016, arXiv:1602.02218v1 [cs.LG] (Year: 2016).
Bengio et al., "On the search for new learning rules for ANNS," Neural Processing Letters, 1995, 12 pages.
Bengio et al., "Advances in optimizing recurrent networks," International Conference on Acoustics, Speech and Signal Processing IEEE, Dec. 2012, 5 pages.
Bengio et al., "Learning a synaptic learning rule," Universite de Montreal, Department d'informatique et de recherché operationnelle, 1990, 6 pages.
Chao et al., "Long Short Term Memory Recurrent Neural Network based Multimodal Dimensional Emotion Recognition," In Proceedings of the 5th International Workshop on AudioNisual Emotion Challenge (AVEC '15) (Year: 2015) pp. 65-72.
Cotter et al., "Fixed-weight networks can learn," International Joint Conference on Neural Networks, 1990, 6 pages.
Daniel et al., "Learning step size controllers for robust neural network training," Association for the Advancement of Artificial Intelligence, Feb. 2016, pp. 1519-1525.
Deng et al., "ImageNet: a large scale hierarchical image database," Computer Vision and Pattern Recognition IEEE, 2009, 8 pages.
Donoho, "Compressed sensing," Transactions on Information Theory IEEE, 2006, 52(4):1289-1306.
Duchi et al., "Adaptive subgradient methods for online learning and stochastic optimization," Journal of Machine Learning Research, Jul. 2011, 39 pages.
EP Office Action in European Appln. No. 17728328.0, dated Feb. 25, 2021, 9 pages.
Feldkamp et al., "A signal processing framework based on dynamics neural networks with application to problems in adaptation, filtering, and classification," Proceedings of the IEEE, 1998, 86(11): 2259-2277.
Flickr.com [online], " Brain neurons," Aug. 15, 2009, retrieved on Sep. 1, 2021, retrieved from URL<https://www.flickr.com/photos/fbobolas/3822222947 />, 1 page.
Flickr.com [online], "Neuron," Oct. 25, 2011, retrieved on Sep. 1, 2021, retrieved from URL<https://www.flickr.com/photos/taylortotz101/6280077898/>, 1 page.
Fu et al., "Deep Q-Networks for Accelerating the training of deep neural networks," arXiv 1606.01467, Jun. 5, 2016, 9 pages.
Gatys et al., "A neural algorithm of artistic style," CoRR, Sep. 2015, arxiv.org/abs/1508.06576, 16 pages.
Graves et al., "Neural Turing machines," CoRR, Dec. 2014, arxiv.org/abs/1410.5401, 26 pages.
Graves, "Supervised Sequence Labelling with Recurrent Neural Networks," 2012. SCI 385, Springer, pp. 37-45 (Year: 2012).
Gregor et al., "Learning Fast Approximations of Sparse Coding," In Proceedings of the 27th International Conference on Machine Learning, Haifa, Israel, 2010. 8 Pages (Year: 2010).
Hinton et al., "Neural Network for Machine Learning—Lecture 6a: Overview of Mini-batch Gradient Descent," available on or before Feb. 12, 2015,via Internet Archive: Wayback Machine URLhttps://web.archive.org/web/20150212142218/https://www.cs.toronto.edu/~tijmen/csc321/slides/lecture_slides_lec6.pdf, retrieved on Jun. 17, 2019, URLhttps://www.cs.toronto.edu/~tijmen/csc321/slides/lecture_slides_lec6.pdf, 31 pages.
Hochreiter et al., "Learning to learn using gradient descent," ICANN2001, LNCS 2130, Aug. 25, 2001, 8.
Hochreiter et al., "Learning to Learn Using Gradient Descent," International Conference on Artificial Neural Networks, Aug. 25, 2001, pp. 87-94.
Hochreiter et al., "Long short-term memory," Neural Computation, 1997, 32 pages.
Kingma et al., "Adam: a method for stochastic optimization," International Conference on Learning Representation, Jan. 2017, 15 pages.
Krizhevsky et al., "Learning multiple layers of features from tiny images," Technical Report, Apr. 8, 2009, 60 pages URLhttps://www.cs.toronto.edu/~kriz/learning-features-2009-TR.pdf.
Lake et al., "Building machines that learn and think like people," Behavioral and Brain Sciences, 2017, 40:e253.
Lin et al., "Network in Network," Mar. 4, 2014. arXiv:1312.4400v3 [cs.NE] (Year: 2014).
Martens et al., "Optimizing neural networks with kronecker-factored approximate curvature," Proceedings of the 32nd International Conference on Machine Learning, 2015, 37:2408-2417.
Miranda et al., "Multi-Objective Optimization for Self-Adjusting Weighted Gradient in Machine Learning Tasks," Jul. 21, 2015. arXiv: 1506.01113v2 [stat.ML]. (Year: 2015).
Nesterov et al., "A method of solving a convex programming problem with convergence rate," Dokl. Akad. Nauk SSSR, 1983, 269(3):543-547 (with English abstract).
Office Action in European Appln. No. 17728328.0, dated Dec. 13, 2022, 10 pages.
PCT International Preliminary Report on Patentability issued in International Application No. PCT/US2017033703, mailed on Nov. 29, 2018, 9 pages.
PCT International Search Report and Written Opinion issued in International Application No. PCT/US2017/033703, mailed on Aug. 16, 2017, 15 pages.
Riedmiller et al., "A direct adaptive method for faster backpropagation learning: the RPROP algorithm," International Conference on Neural Networks, 1993, 6 pages.
Santoro et al., "Meta-learning with memory-augmented neural networks," Proceedings of The 33rd International Conference on Machine Learning, 2016, 48:1842-1850.
Schmidhuber et al., "Shifting inductive bias with success-story algorithm, adaptive Levin search and incremental self-improvement," Machine Learning, 1997, 9 pages.
Schmidhuber, "Learning to control fast-weight memories: an alternative to dynamic recurrent networks," Neural Computation, Jan. 1992, 4(1):131-139.
Schnnidhuber, "Reducing the ratio between learning complexity and number of time varying variables in fully recurrent nets," In International Conference on Artificial Neural Networks (pp. 460-463). Springer, London. (Year: 1993).
Schraudolph, "Local gain adaptation in stochastic gradient descent," International Conference on Artificial Neural Networks, 1999, 7 pages.
Sutton, "Adapting bias by gradient descent: an incremental version of delta-bar-delta," Association for the Advancement of Artificial Intelligence, 1992, 6 pages.
Tseng et al., "An incremental gradient (-projection) method with momentum term and adaptive stepsize rule," Siam J. Optim., Jul. 2006, 8(2):506-531.
Wen et al., "Latent Factor Guided Convolutional Neural Networks for Age-Invariant Face Recognition," 2016 IEEE Conference on Computer Vision and Pattern Recognition (CVPR), 2016, pp. 4893-4901 (Year: 2016).
Werbos, "Backpropagation through time: what it does and how to do it," Proceedings of the IEEE, vol. 78, No. 10, pp. 1550-1560, Oct. 1990 (Year: 1990).
Wolpert et al., "No free lunch theorems for optimization," Transactions on Evolutionary Computation, Apr. 1997, 1(1):67-82.
Wright, "Coordinate descent algorithms," Math. Program., Ser. B (2015) 151:3-34 (Year: 2015).

(56) References Cited

OTHER PUBLICATIONS

Younger et al., "Meta-learning with backpropagations," IJCNN'01. International Joint Conference on Neural Networks. Proceedings (Cat. No.01CH37222), Jul. 2001, pp. 2001-2006.

* cited by examiner

TRAINING MACHINE LEARNING MODELS BY DETERMINING UPDATE RULES USING NEURAL NETWORKS

CROSS-REFERENCE TO RELATED APPLICATION

This patent application is a continuation (and claims the benefit of priority under 35 USC 120) of U.S. patent application Ser. No. 16/302,592, filed Nov. 16, 2018, which is a National Stage Application under 35 U.S.C. 371 of International Application No. PCT/US2017/033703, filed May 19, 2017, which claims priority to U.S. Provisional Patent Application No. 62/339,785, filed May 20, 2016, the entire contents of which are hereby incorporated by reference.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can replace hard-coded parameter optimization algorithms, e.g., gradient descent optimization algorithms, with a trainable deep recurrent neural network. Hand-designed update rules for the parameters of a machine learning model are replaced with a learned update rule.

In general, one innovative aspect of the subject matter described in this specification can be embodied in methods including obtaining a machine learning model, wherein (i) the machine learning model comprises one or more model parameters, and (ii) the machine learning model is trained using gradient descent techniques to optimize an objective function; for each time step in a plurality of time steps: determining an update rule for the model parameters for the time step using a recurrent neural network (RNN), comprising: providing as input to the RNN, a gradient of the objective function with respect to the model parameters for the time step; generating a respective RNN output from the provided input for the time step, wherein the RNN output comprises an update rule for the model parameters at the time step that is dependent on one or more RNN parameters; training the RNN using the generated output and a RNN objective function that depends on each preceding time step in the plurality of time steps, comprising determining RNN parameters that minimize the RNN objective function for the time step using gradient descent techniques; based on the determined RNN parameters, determining an update rule for the model parameters that minimizes the objective function for the time step; and applying the determined update rule for the time step to the model parameters.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations applying the determined update rule for a final time step in the plurality of time steps to the model parameters generates trained model parameters.

In some implementations the machine learning model comprises a neural network.

In some implementations the determined update rule for the model parameters that minimizes the objective function is given by $$\theta_{t+1} = \theta_t + g_t(\nabla f(\theta_t), \phi)$$

wherein $\theta_t$ represents model parameters at time t, $\nabla f(\theta_t)$ represents the gradient of objective function $f$, $\phi$ represents RNN parameters and $g_t$ represents the RNN output for the time step t.

In some implementations the RNN operates coordinate-wise on the objective functions parameters.

In some implementations the RNN implements separate activations for each model parameter.

In some implementations applying the determined update rule for the time step to the model parameters comprises using a long short-term memory (LSTM) neural network.

In some implementations the LSTM network comprises two LSTM layers.

In some implementations the LSTM neural network shares parameters across different coordinates of the objective function.

In some implementations a subset of cells in each LSTM layer comprise global averaging units, wherein a global average unit is a unit whose update includes a step that averages the activations of the units globally at each step across the different coordinate wise LSTMs.

In some implementations a same update rule is applied independently on each coordinate.

In some implementations the RNN is invariant to the order of the model parameters.

In some implementations the method further comprises providing a previous hidden state of the RNN as input to the RNN for the time step.

In some implementations the determined update rule for the model parameters that minimizes the objective function for the time step depends on a hidden state of the RNN for the time step.

In some implementations the RNN objective function is given by $$\mathcal{L}(\phi) = E_f\left[\sum_{t=1}^{T} w_t f(\theta_t)\right]$$

where $$\theta_{t+1} = \theta_t + g_t, \begin{bmatrix} g_t \\ h_{t+1} \end{bmatrix} = m(\nabla_t, h_t, \phi), \phi$$

represents the RNN parameters, $f(\theta_t)$ represents the machine learning model objective function that depends on the machine learning model parameters $\theta$ at time t, $w_t \in \mathbb{R}_{\geq 0}$ represents weights associated with each time step t, $g_t$ represents a RNN output for time t, $h_t$ represents a hidden state of the RNN at time t, m represents the RNN and $\nabla_t = \nabla_\theta f(\theta_t)$ In some implementations the method further comprises preprocessing the input to the RNN to disregard gradients that are smaller than a predetermined threshold.

In some implementations a trained machine learning model may be output that is based upon the obtained machine learning model with updated parameters based upon the implementations described above. The machine learning model may be used to process input data to generate output data. The input data may be data associated with a real-world environment and the output data may provide an output associated with the real-world environment.

The subject matter described in this specification can be implemented in particular embodiments so as to realize one or more of the following advantages.

A system for training machine learning models using a recurrent neural network, as described in this specification, may outperform systems that train machine learning models using other methods, e.g., using hard-coded optimization algorithms. For example, machine learning models that have been trained using a recurrent neural network may perform respective machine learning tasks more accurately and efficiently.

A system for training machine learning models using a recurrent neural network, as described in this specification, may achieve a high degree of transfer. For example, a recurrent neural network trained on machine learning tasks with a first number of task parameters may be generalizable to machine learning tasks with a second, higher number of task parameters. Alternatively or in addition, the recurrent neural network may be generalizable to further machine learning tasks and/or different types of neural network inputs. Embodiments may therefore provide improvements in generation of machine learning models that may provide improved performance for processing data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
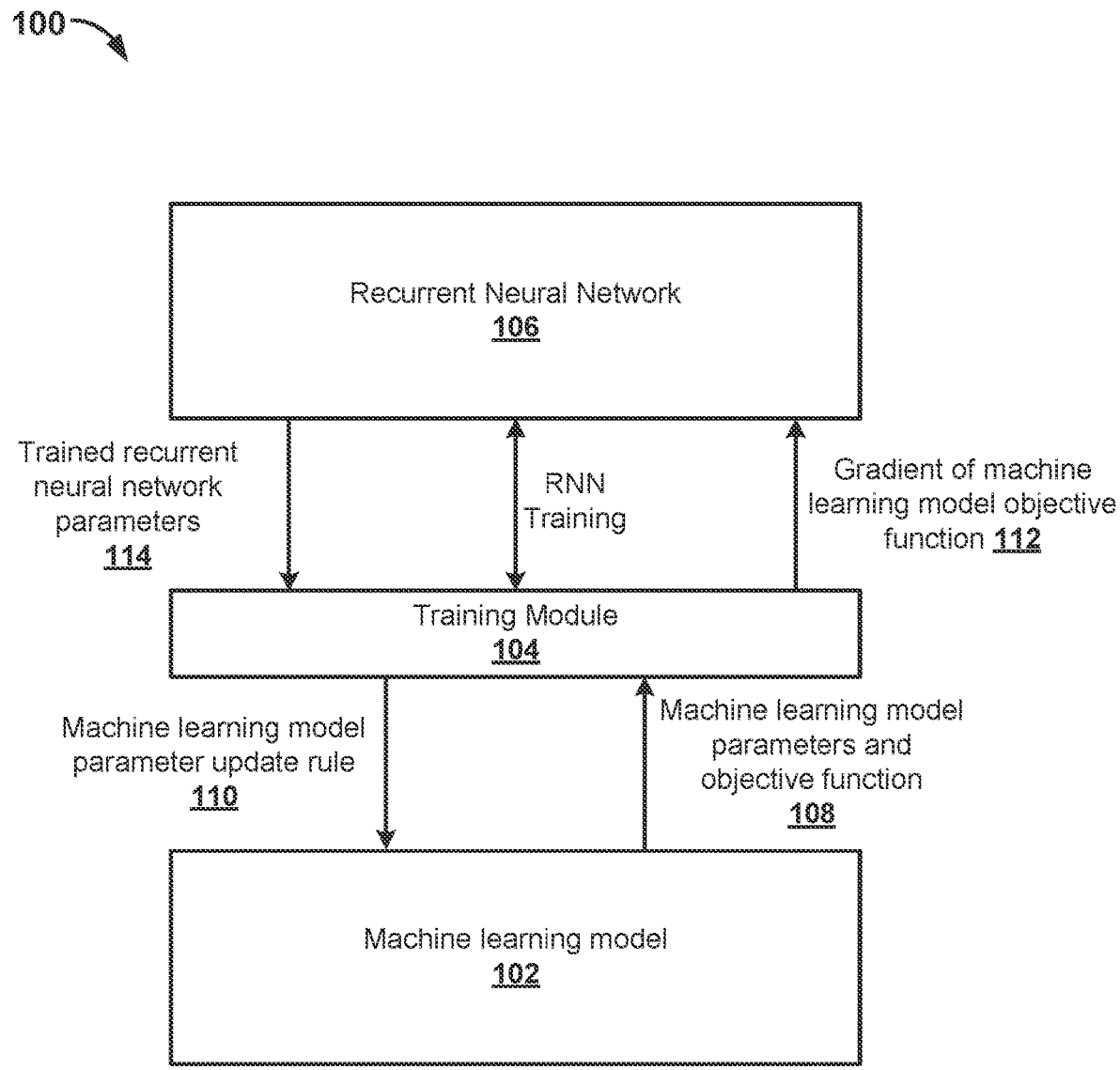
FIG. 1A is an illustration of an example system for training a machine learning model.

FIG. 1A is a block diagram of an example system 100 for training a machine learning model. The system 100 is an example of a system implemented as computer programs on one or more computers in one or more locations, in which the systems, components, and techniques described below can be implemented.

The system 100 includes a machine learning model 102, a training module 104, and a recurrent neural network (RNN) 106. The machine learning model 102 can be trained to perform a machine learning task. For example, the machine learning model may be trained to perform classification tasks. The classification tasks are typically tasks associated with real-world input data such as speech recognition, image recognition or natural language processing, regression tasks, or robot learning tasks. For example, the machine learning models may include deep neural networks e.g., convolutional neural networks, or support vector machines.

The machine learning model 102 has a set of machine learning model parameters. For example, in cases where the machine learning model 102 includes a neural network, the machine learning model parameters may include neural network weights for the neural network. As another example, in cases where the machine learning model 102 includes a support vector machine, the machine learning model parameters may include kernel parameters or soft margin parameters for the support vector machine.

The machine learning model 102 can be trained to perform the machine learning task using gradient descent techniques to optimize a machine learning model objective function. For example, in cases where the machine learning model 102 is a neural network, the machine learning model may be trained to perform a respective machine learning task using backpropagation of errors. During a backpropagation training process, training inputs are processed by the neural network to generate respective neural network outputs. The outputs are then compared to a desired or known output using an objective function, e.g., a loss function, and error values are determined. The error values are used to calculate a gradient of the objective function with respect to the neural network parameters. The gradient is then used as input to an update rule to determine an update for the neural network parameters that minimizes the objective function. One example of a conventional update rule is given by equation (1) below.

$$\theta_{t+1} = \theta_t - \alpha_t \nabla f(\theta_t) \qquad (1)$$

In equation (1), $\theta_t$ represents the neural network parameters at time t, $\alpha_t$ represents a learning rate at time t, and $f(\theta_t)$ represents the objective function.

The training module 104 communicates with the machine learning models 102 and the RNN 106. The training module 104 is configured to train the machine learning model 102 by determining a learned parameter update rule for the machine learning model parameters using the RNN 106. The learned parameter update rule for the machine learning model parameters can be implemented over a sequence of time steps t=1, . . . , T to adjust the values of the machine learning model parameters from initial or current values, e.g., at time t=1, to trained values, e.g., at time t=T. A learned update rule for a set of machine learning model parameters for time step t+1 is given by equation (2) below.

$$\theta_{t+1} = \theta_t + g_t(\nabla f(\theta_t), \phi) \qquad (2)$$

In equation (2), $\theta_t$ represents the machine learning model parameters at time t, $\nabla f(\theta_t)$ represents the gradient of the machine learning model objective function $f$, $\phi$ represents RNN 106 parameters and $g_t$ represents a RNN output for the time step t in accordance with current values of the RNN parameters.

To determine the above learned update rule for time t+1, the training module 104 is configured to compute or obtain a gradient of the machine learning model objective function at time t with respect to the machine learning model parameters at time t. For example, the training module 104 may be configured to receive data representing machine learning model parameters at time t and objective function at time t 108, and to compute data representing the gradient of the machine learning model objective function with respect to the machine learning model parameters at time t. The training module 104 is configured to provide obtained or computed gradients to the RNN 106 as input. For example, the training module 104 may be configured to provide data representing the gradient of the machine learning model objective function at time t 112 as input to the RNN 106.

The RNN 106 is configured to process the received data representing the gradient of the machine learning model objective function at time t 112 to generate a respective RNN output for time t that is dependent on the one or more RNN parameters ϕ, e.g., as represented by $g_t$ described above with reference to equation (2). Processing received RNN inputs to generate respective RNN outputs is described in more detail below.

The training module 104 is configured to update the values of the RNN parameters ϕ whilst training the machine learning model 102. Updating the values of the RNN parameters includes determining values of the RNN parameters ϕ that minimize a RNN objective function using gradient descent techniques. In some implementations the RNN objective function is given by equation (3) below.

$$\mathcal{L}(\phi) = E_f\left[\sum_{t=1}^{T} w_t f(\theta_t)\right] \quad (3)$$

where $\theta_{t+1} = \theta_t + g_t$, $$\begin{bmatrix} g_t \\ h_{t+1} \end{bmatrix} = m(\nabla_t, h_t, \phi).$$

In equation (3), ϕ represents the RNN parameters, $f(\theta_t)$ represents the machine learning model objective function that depends on the machine learning model parameters θ at time t, $w_t \in \mathbb{R}_{\geq 0}$ represents weights, e.g., predetermined weights, associated with each time step t, $g_t$ represents a RNN output for time t, $h_t$ represents a hidden state of the RNN at time t, m represents the RNN and $\nabla_t = \nabla_\theta f(\theta_t)$.

The training module 104 is configured to determine the learned update rule for time t+1 in equation (2) above using the values of the RNN parameters ϕ for time t and gradients of respective machine learning model objective functions f. The learned update rule 110 may then be applied to the machine learning model parameters to update the machine learning model 102. This process may be iteratively repeated over a sequence of time steps t=1, . . . , T to generate a trained machine learning model. In some implementations the number of time steps T may be a predetermined number, e.g., a number chosen based on available memory in the system 100. For example, T may be chosen as the highest number possible, given the available memory constraint. In some cases a trained machine learning model may generated when the machine learning model converges, e.g., the machine learning model parameters converge towards trained values. In these cases, the number of time steps T depends on the convergence rate.

As described above, the recurrent neural network 106 has RNN parameters 114, e.g., RNN weights. The RNN 106 is configured to receive an RNN input at each time step in a sequence of multiple time steps, e.g., data representing a gradient of a machine learning model objective function with respect to machine learning model parameters 112. In some implementations the RNN 106 may be invariant to the order of the machine learning model parameters. That is, interfacing between the RNN 106 and the machine learning model 102 may require fixing a particular order of the parameters of the machine learning model 102, e.g., numbering parameters of the machine learning model 102 and putting them into a list. The ordering may be arbitrary, e.g., a predetermined order, but must be fixed so that outputs of the RNN 106 may be matched to parameters of the machine learning model 102. Invariance of the RNN 106 to the order of the machine learning model parameters enables the same results regardless of which ordering is picked.

The RNN 106 processes each received RNN input to generate a respective RNN output for the time step in accordance with the RNN parameters, e.g., an update rule for the machine learning model parameters that is dependent on one or more of the RNN parameters. The RNN 106 may be trained to generate RNN outputs from received inputs using gradient descent techniques to optimize a RNN objective function.

In some implementations the RNN 106 may be a fully connected RNN. In other implementations the RNN 106 may be a coordinate-wise RNN that operates on each RNN parameter individually. This architecture may be used when the number of RNN parameters exceeds a parameter threshold, e.g., when the number of RNN parameters is of the order of tens of thousands of parameters. The RNN 106 may be configured to operate on RNN parameters individually by using separate activations for each machine learning model parameter. In this manner, the RNN 106 may be invariant to the order of parameters in the network, since a same parameter update rule may be used independently on each parameter.

In some implementations the RNN 106 may include one or more Long Short-Term Memory (LSTM) neural network layers, e.g., two LSTM neural network layers. A LSTM neural network layer is a neural network layer that has one or more LSTM memory blocks. In these implementations, at each time step, the RNN 106 may be configured to receive as input data representing a gradient of machine learning model objective functions with respect to a single machine learning model parameter together with a previous hidden state of the RNN. The RNN 106 may then generate as output an update for the corresponding machine learning model parameter. In some implementations the LSTM neural network layers may share layer parameters across different coordinates of the machine learning model objective function. In some implementations the LSTM neural network layers may include one or more global averaging cells, i.e., units whose update includes a step that averages the activations of the units globally at each step across the different coordinate wise LSTMs.

In some implementations the RNN inputs, e.g., data representing the gradient of the machine learning model objective function 112 and data representing generated update rules for the machine learning model parameters, may be rescaled using one or more constants. For example, the training module 104 may be configured to rescale the RNN inputs or outputs to ensure that the RNN inputs and outputs are neither too small nor too large. For example, the training module 104 may be configured to preprocess the RNN inputs according to equation (4) below.

$$\nabla^k \to \begin{cases} \left(\dfrac{\log|\nabla|}{p}, \mathrm{sgn}(\nabla)\right) & \text{if } |\nabla| \geq e^{-p} \\ (-1, e^p \nabla) & \text{otherwise} \end{cases} \quad (4)$$

In equation (4) p>0 is a parameter controlling how small gradients are disregarded. In some implementations p=10. Equation (4) considers the magnitude and direction components of the gradient separately—in some cases the magnitude component is a problematic component, so it gets mapped into log space (softly from above and truncated from below). The direction component, which is important for optimization, is preserved. Preprocessing RNN according to equation (4) reduces the range in which the scale of the gradient can change over training.

Figure 1B:
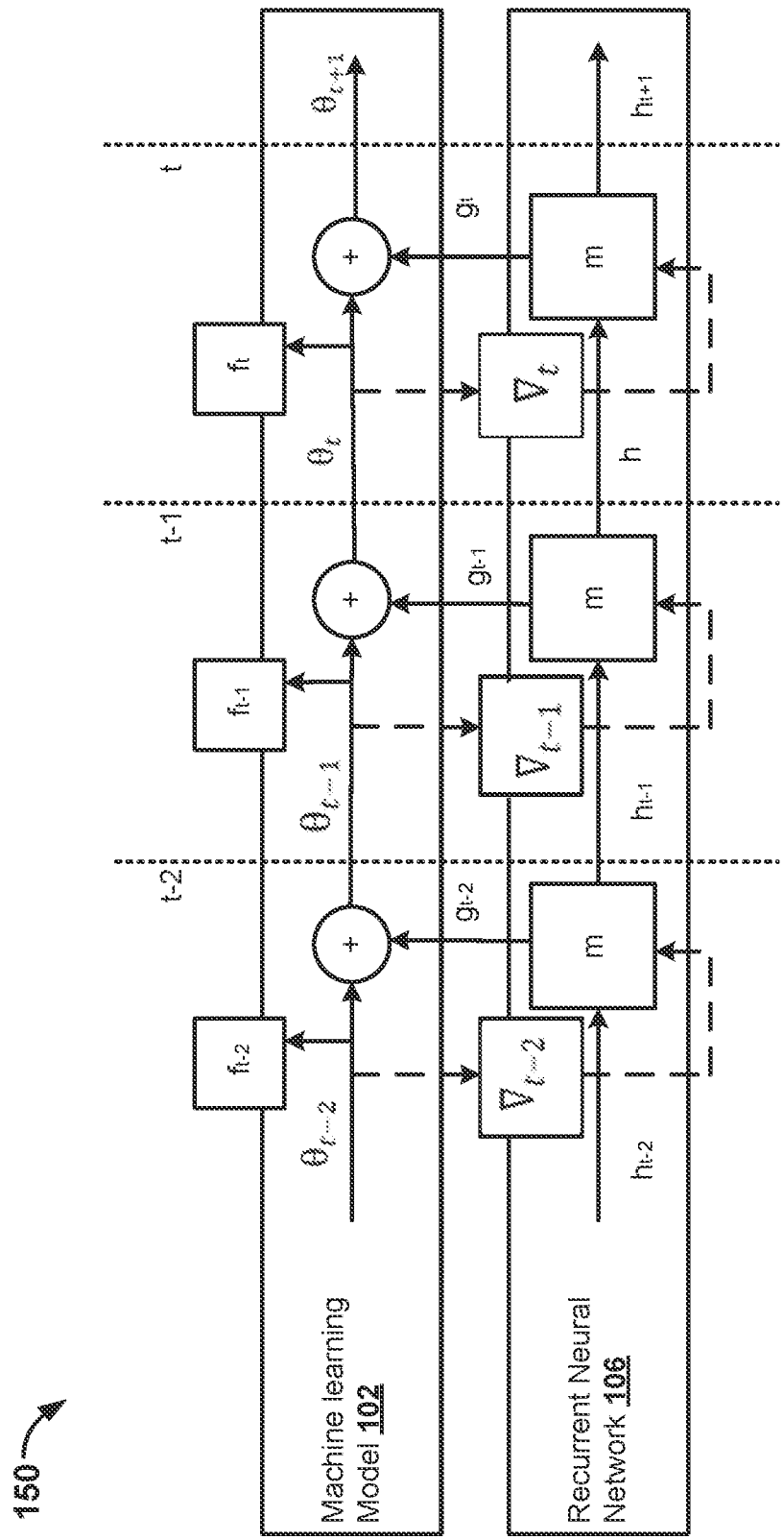
FIG. 1B is an illustration of a data flow graph for computing the gradient of a recurrent neural network objective function.

FIG. 1B is an illustration of an example data flow graph 150 for computing the gradient of a recurrent neural network objective function. For example, the data flow graph 150 may be used to compute the gradient of RNN 106 using machine learning model parameters of machine learning model 102.

In the example data flow graph 150, $\theta_t$ represents machine learning model 102 parameters at time t, and $f_t$ represents machine learning model 102 objective function at time t, $\nabla_t$ represents the gradient of the objective function $f_t$ with respect to the parameters $\theta_t$, $h_t$ represents the state of the RNN at time t, $g_t$ represents a RNN output at time t, and m represents the RNN 106.

Figure 2:
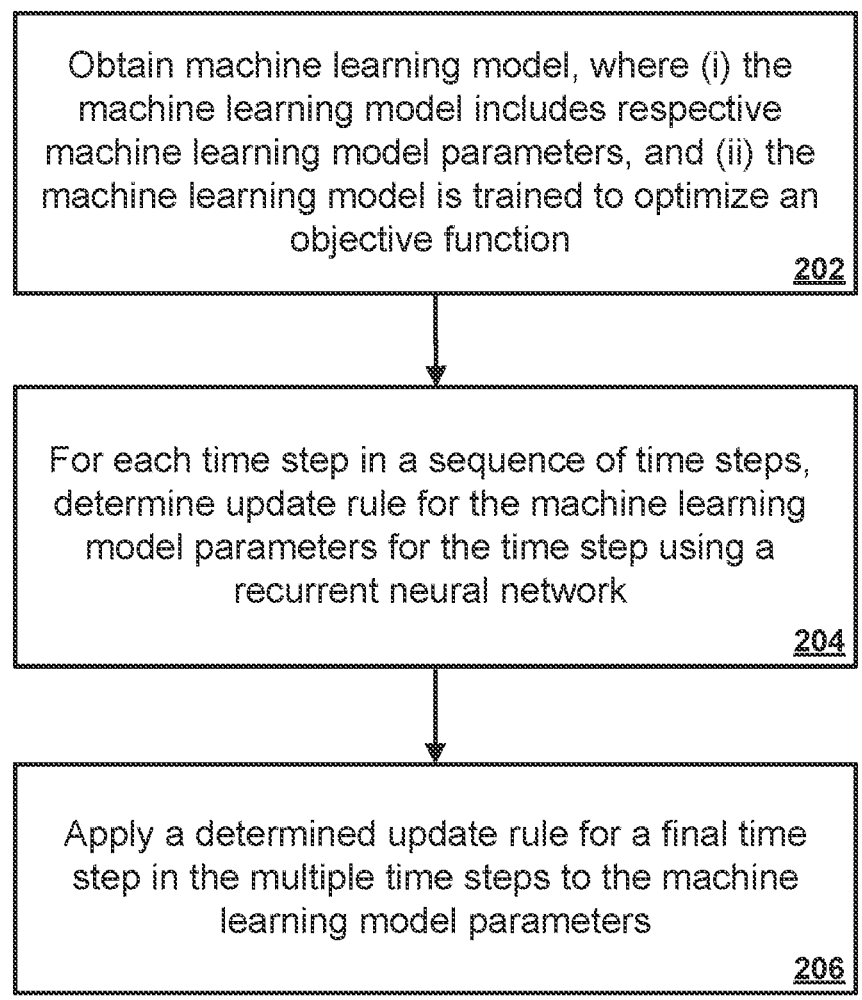
FIG. 2 is a flow diagram of an example process for training a machine learning model.

FIG. 2 is a flow diagram of an example process 200 for training a machine learning model. For convenience, the process 200 will be described as being performed by a system of one or more computers located in one or more locations. For example, a machine learning model training module, e.g., the training module 104 of FIG. 1A, can perform the process 200.

The system obtains data specifying a machine learning model (step 202). For example, the machine learning model may include a machine learning model that may be trained to perform a machine learning task, including a classification task such as speech recognition, image recognition or natural language processing, regression task or robot learning task.

The machine learning model has a respective set of machine learning model parameters. For example, as described above with reference to FIG. 1A, in some implementations the machine learning model may include a neural network. In these implementations the machine learning model parameters may include neural network parameters, e.g., neural network weights, for the neural network. The machine learning model is a machine learning model that is trained using gradient descent techniques to optimize a respective objective function.

For each time step in a sequence of time steps, the system determines an update rule for the machine learning model parameters for the time step using a recurrent neural network (RNN) (step 204). The RNN includes one or more RNN parameters and is trained using gradient descent techniques to optimize a RNN objective function. The update rule for the machine learning model parameters for the time step is a parameterized update rule—that is a function of update rule parameters—that may be used to adjust the values of the machine learning model parameters. Determining the update rule for the machine learning model parameters using the RNN includes training the RNN to determine RNN parameters that minimize the RNN objective function, and using trained RNN parameters to determine a final update rule that is used to generate the trained machine learning model. Determining an update rule for model parameters using a RNN is described in more detail below with reference to FIG. 3.

For each time step in the sequence of time steps, the system applies the determined update rule for the time step to the machine learning model parameters (step 206). In some implementations a same update rule is applied independently to each of the machine learning model parameters, e.g., using coordinate-wise network architecture as described above with reference to FIG. 1A.

Sequential application of the determined update rules for each time step in the sequence of time steps t=1, ..., T, adjusts the values of the machine learning model parameters from initial values, e.g., at time t=1, to trained values, e.g., at time t=T. Once trained, the machine learning model may be used to perform its respective machine learning task.

Figure 3:
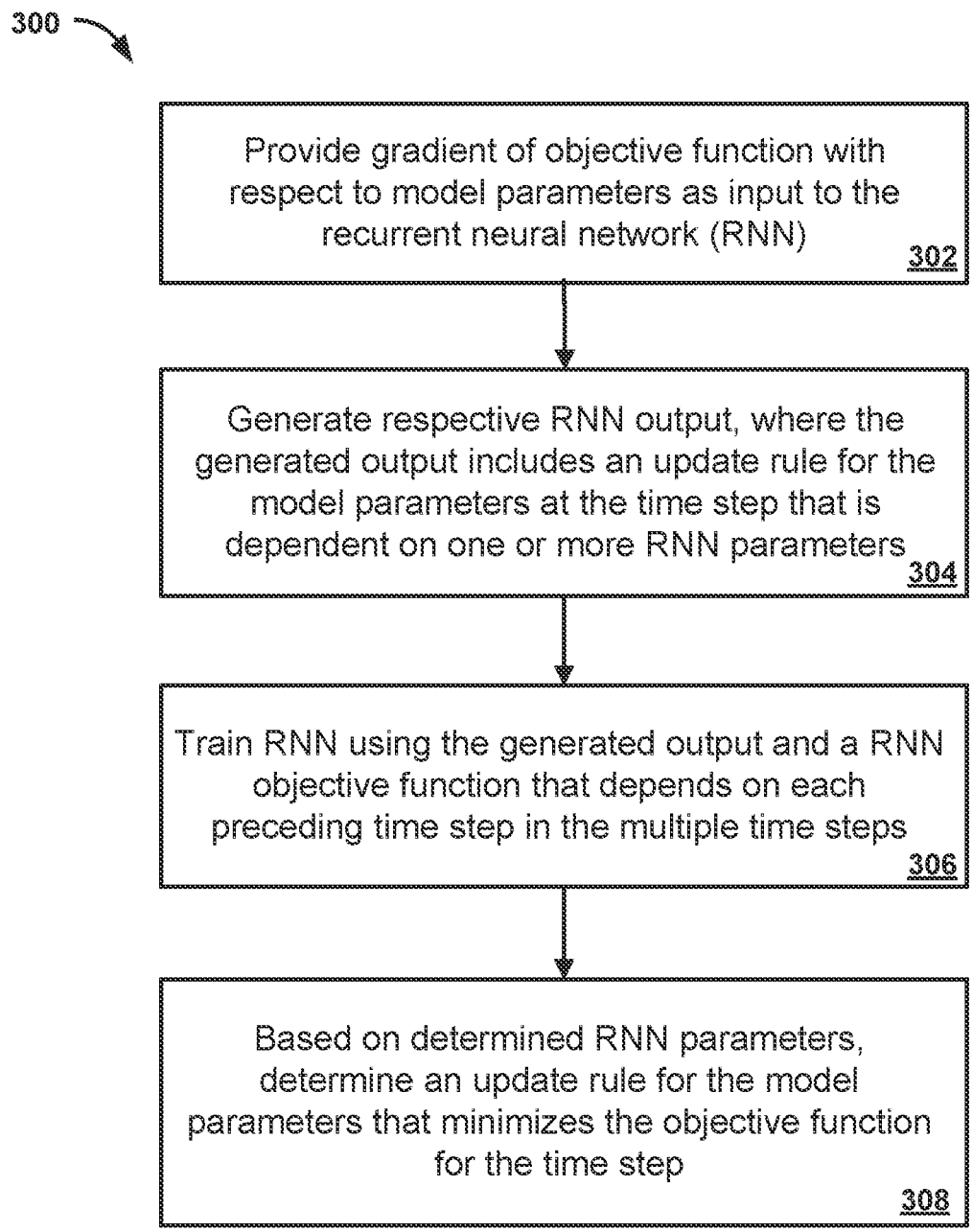
FIG. 3 is a flow diagram of an example process for determining an update rule for machine learning model parameters using a recurrent neural network.

FIG. 3 is a flow diagram of an example process 300 for determining an update rule for a set of machine learning model parameters using a recurrent neural network (RNN). The example process 300 may be performed for each time step in a sequence of multiple time steps. For convenience, the process 300 will be described as being performed by a system of one or more computers located in one or more locations. For example, a machine learning model training module, e.g., the training module 104 of FIG. 1A, can perform the process 300.

The system provides a gradient of the machine learning model objective function with respect to the machine learning model parameters for the time step t as input to the RNN (step 302). Optionally, the system may further provide a previous hidden state of the RNN as input to the RNN for the time step.

The system generates a respective RNN output from the provided input for the time step (step 304). The RNN output corresponds to $g_t$ in equation (2) above, and may be used to determine the update rule given by equation (2) above for the machine learning model parameters at the time step that is dependent on one or more RNN parameters.

The system trains the RNN using the generated output and a RNN objective function that depends on each preceding time step in the sequence of multiple time steps (step 306). In some implementations the RNN objective function is given by equation (3) above, which is repeated below for clarity.

$$\mathcal{L}(\phi) = E_f\left[\sum_{t=1}^{T} w_t f(\theta_t)\right] \quad (3)$$

where $\theta_{t+1} = \theta_t + g_t$, $$\begin{bmatrix} g_t \\ h_{t+1} \end{bmatrix} = m(\nabla_t, h_t, \phi).$$

In equation (3), $\phi$ represents the RNN parameters, $f(\theta_t)$ represents the machine learning model objective function that depends on the machine learning model parameters $\theta$ at time t, $w_t \in \mathbb{R}_{\geq 0}$ represents weights, e.g., predetermined weights, associated with each time step, $g_t$ represents the RNN output for the time t, $h_t$ represents a hidden state of the RNN at time t, m represents the RNN and the notation $\nabla_t = \nabla_\theta f(\theta_t)$ is used. In some implementations $w_t > 0$, e.g., at intermediate points along the trajectory. For example, in some cases $w_t = 1$ for all t.

The system trains the RNN by determining values of the RNN parameters $\phi$ that minimize the RNN objective function $\mathcal{L}(\phi)$ for the time step using gradient descent techniques. For example, the system may compute a gradient estimate $\partial \mathcal{L}(\phi)/\partial \theta$ by sampling a random function $f$ and applying backpropagation techniques, as described above with reference to FIGS. 1A and 1B. In some implementations it is assumed that gradients of the machine learning model does not depend on the RNN parameters $\phi$, i.e., $\partial \Delta/\partial \phi = 0$.

Based on the determined RNN parameters $\phi$, the system determines an update rule for the machine learning model parameters that minimizes the machine learning model objective functions for the time step (step 308). In some implementations the determined update rule for the machine learning model parameters that minimizes the machine learning model objective functions is given by equation (2) above, which is repeated below for clarity.

$$\theta_{t+1} = \theta_t + g_t(\nabla f(\theta_t), \phi) \qquad (2)$$

In equation (2), $\theta_t$ represents machine learning model parameters at time t, $\nabla f(\theta_t)$ represents the gradient of objective function $f$, as described above with reference to step 402, $\phi$ represents the determined values of the RNN parameters and $g_t$ represents the RNN output for the time step. Although not shown in the above equation, in some implementations the determined update rule for the model parameters that minimizes the objective functions for the time step further depends on a hidden state $h_t$ of the RNN for the time step.

In some implementations a learned update rule, as given by equation (2) above, may be applied to other machine learning models that are configured to perform similar machine learning tasks, e.g., machine learning tasks with a similar structure. For example, the learned update rule may be applied to a second machine learning model that is configured to perform a same machine learning task as the first machine learning model (e.g., the machine learning model 102 of FIG. 1A), but where the second machine learning model includes a different number of hidden units or neural network layers than the first machine learning model. As another example, the learned update rule may be applied to a second machine learning model that is configured to perform a same machine learning task as the first machine learning model but where the second machine learning model includes a different activation function to the first machine learning model.

Applying the learned update rule to other machine learning models in these examples can be achieved using the coordinate-wise RNN described above with reference to FIG. 1, e.g., a neural network that uses a single coordinate to define the RNN and shares RNN parameters across different machine learning model parameters. Different behavior on each coordinate may be achieved using separate activation functions for each objective function parameter. The learned update rule may be implemented for each coordinate using the RNN, e.g., a two-layer LSTM network, using forget gate architecture. The network takes as input the machine learning model gradient for a single coordinate as well as the previous hidden state and outputs the update for the corresponding machine learning model parameter.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for training a target machine learning model having a plurality of model parameters using an optimizer neural network having a plurality of optimizer parameters, the method comprising, at each current iteration of a plurality of iterations:
   determining a respective update rule for each of the plurality of model parameters using the optimizer neural network by operating the optimizer neural network independently on each of the plurality of model parameters of the target machine learning model, the determining comprising, for each respective model parameter:
      generating a respective parameter-specific input that comprises a gradient of a target objective function of the target machine learning model with respect to the respective model parameter; and
      processing the respective parameter-specific input using the optimizer neural network and in accordance with current values of the optimizer parameters to generate a respective optimizer output that specifies a respective parameter-specific update rule for updating the respective model parameter;

applying the update rules generated by the optimizer neural network to the model parameters of the target machine learning model to update values of the model parameters; and updating the current values of the optimizer parameters by using gradient descent techniques to minimize an optimizer objective function that depends at least on a function value of the target objective function of the target machine learning model computed using the values of the model parameters of the target machine learning model that have been updated at the current iteration.

2. The method of claim 1, wherein applying the determined update rule for a final iteration in the plurality of iterations to the model parameters generates trained model parameters.

3. The method of claim 1, wherein the target machine learning model comprises a neural network.

4. The method of claim 1, wherein the current iteration is an iteration after the first iteration of the plurality of iterations, and the optimizer objective function further depends on the values of the model parameters at one or more iterations that precede the current iteration.

5. The method of claim 1, wherein the optimizer neural network is a recurrent neural network (RNN).

6. The method of claim 5, further comprising, at each of the plurality of iterations, providing a previous hidden state of the RNN as input to the RNN for the iteration.

7. The method of claim 5, wherein the optimizer neural network is a long short-term memory (LSTM) neural network.

8. The method of claim 1, further comprising preprocessing the respective parameter-specific inputs to the optimizer neural network to disregard gradients that are smaller than a predetermined threshold.

9. The method of claim 1, wherein the optimizer objective function further depends on function values computed by applying the target objective function of the target machine learning model to the values of the model parameters that have been computed at one or more iterations that precede the current iteration.

10. The method of claim 9, wherein the optimizer objective function is computed at the current iteration based on a weighted sum of function values of the target objective function of the target machine learning model, wherein each function value is computed by applying the target objective function to the values of the model parameters that have been computed at the current iteration or at an iteration that precede the current iteration.

11. A system comprising one or more computers and one or more storage devices storing instructions that are operable, when executed by the one or more computers, to cause the one or more computers to perform operations for training a target machine learning model having a plurality of model parameters using an optimizer neural network having a plurality of optimizer parameters, the operations comprising, at each current iteration of a plurality of iterations:

determining a respective update rule for each of the plurality of model parameters using the optimizer neural network by operating the optimizer neural network independently on each of the plurality of model parameters of the target machine learning model, the determining comprising, for each respective model parameter:

generating a respective parameter-specific input that comprises a gradient of a target objective function of the target machine learning model with respect to the respective model parameter; and processing the respective parameter-specific input using the optimizer neural network and in accordance with current values of the optimizer parameters to generate a respective optimizer output that specifies a respective parameter-specific update rule for updating the respective model parameter;

applying the update rules generated by the optimizer neural network to the model parameters of the target machine learning model to update values of the model parameters; and updating the current values of the optimizer parameters by using gradient descent techniques to minimize an optimizer objective function that depends at least on a function value of the target objective function of the target machine learning model computed using the values of the model parameters that have been updated at the current iteration.

12. The system of claim 11, wherein applying the determined update rule for a final iteration in the plurality of iterations to the model parameters generates trained model parameters.

13. The system of claim 11, wherein the target machine learning model comprises a neural network.

14. The system of claim 11, wherein the optimizer objective function further depends on the values of the model parameters at one or more iterations that precede the current iteration.

15. The system of claim 11, wherein the optimizer neural network is a recurrent neural network (RNN).

16. One or more non-transitory computer-readable storage media storing instructions that, when executed by one or more computers, cause the one or more computers to perform operations for training a target machine learning model having a plurality of model parameters using an optimizer neural network having a plurality of optimizer parameters, the operations comprising, at each current iteration of a plurality of iterations:

determining a respective update rule for each of the plurality of model parameters using the optimizer neural network by operating the optimizer neural network independently on each of the plurality of model parameters of the target machine learning model, the determining comprising, for each respective model parameter:

generating a respective parameter-specific input that comprises a gradient of a target objective function of the target machine learning model with respect to the respective model parameter; and processing the respective parameter-specific input using the optimizer neural network and in accordance with current values of the optimizer parameters to generate a respective optimizer output that specifies a respective parameter-specific update rule for updating the respective model parameter;

applying the update rules generated by the optimizer neural network to the model parameters of the target machine learning model to update values of the model parameters; and updating the current values of the optimizer parameters by using gradient descent techniques to minimize an optimizer objective function that depends at least on a function value of the target objective function of the target machine learning model computed using the values of the model parameters that have been updated at the current iteration.

17. The one or more non-transitory computer-readable storage media of claim 16, wherein applying the determined update rule for a final iteration in the plurality of iterations to the model parameters generates trained model parameters.

18. The one or more non-transitory computer-readable storage media of claim 16, wherein the target machine learning model comprises a neural network.

19. The one or more non-transitory computer-readable storage media of claim 16, wherein the optimizer objective function further depends on the values of the model parameters at one or more iterations that precede the current iteration.

\* \* \* \* \*